(12) United States Patent
Hagiwara et al.

(10) Patent No.: US 10,352,429 B2
(45) Date of Patent: Jul. 16, 2019

(54) STEERING RACK AND MANUFACTURING METHOD THEREFOR

(71) Applicant: NSK LTD., Tokyo (JP)

(72) Inventors: Nobuyuki Hagiwara, Fujisawa (JP); Yuuki Mizushima, Fujisawa (JP); Kazuto Kobayashi, Fujisawa (JP)

(73) Assignee: NSK LTD., Tokyo (JP)

( * ) Notice: Subject to any disclaimer, the term of this patent is extended or adjusted under 35 U.S.C. 154(b) by 22 days.

(21) Appl. No.: 15/575,876

(22) PCT Filed: Aug. 25, 2016

(86) PCT No.: PCT/JP2016/074789
§ 371 (c)(1),
(2) Date: Nov. 21, 2017

(87) PCT Pub. No.: WO2017/033995
PCT Pub. Date: Mar. 2, 2017

(65) Prior Publication Data
US 2018/0128363 A1    May 10, 2018

(30) Foreign Application Priority Data

Aug. 25, 2015   (JP) ................. 2015-165384

(51) Int. Cl.
*B21J 5/02*       (2006.01)
*F16H 55/26*      (2006.01)
*B21K 1/76*       (2006.01)
*B62D 3/12*       (2006.01)
*B21J 13/02*      (2006.01)

(52) U.S. Cl.
CPC ............. *F16H 55/26* (2013.01); *B21K 1/762* (2013.01); *B21K 1/767* (2013.01); *B62D 3/126* (2013.01); *B21J 5/02* (2013.01); *B21J 13/025* (2013.01)

(58) Field of Classification Search
CPC .......... B62D 3/126; F16H 55/26; B21K 1/767
See application file for complete search history.

(56) References Cited

U.S. PATENT DOCUMENTS 3,718,052 A * 2/1973 Barr ................. F16H 55/26
                                                    29/893.31
4,444,070 A * 4/1984 Yanai ................ B62D 3/123
                                                    74/422
(Continued)

FOREIGN PATENT DOCUMENTS

EP     2676865 A2 * 12/2013 ............ F16H 55/26
EP     2676865 B1 *  9/2017
(Continued)

OTHER PUBLICATIONS

International Search Report for PCT/JP2016/074789 dated Sep. 20, 2016 [PCT/ISA/210].
(Continued)

*Primary Examiner* — William Kelleher
*Assistant Examiner* — Gregory T Prather
(74) *Attorney, Agent, or Firm* — Sughrue Mion, PLLC

(57) ABSTRACT

A steering rack includes a rack shaft (10), a plurality of rack teeth (11a) formed on the rack shaft and each having a tooth trace inclined with respect to a first direction perpendicular to an axial direction of the rack shaft, and a dummy tooth (33a) aligned with the rack teeth and formed on the rack shaft. The dummy tooth (33a) is non-uniformly formed in a second direction parallel to the tooth trace of the rack tooth (11a).

14 Claims, 15 Drawing Sheets

(56) References Cited

U.S. PATENT DOCUMENTS

| | | | | |
|---|---|---|---|---|
| 4,475,413 A * | 10/1984 | Higuchi | ................ | B62D 3/126 74/422 |
| 2002/0044439 A1* | 4/2002 | Shiokawa | .............. | B21K 1/767 362/37 |
| 2011/0204588 A1* | 8/2011 | Yang | ...................... | B62D 3/126 280/93.514 |
| 2015/0298721 A1* | 10/2015 | Suzuki | .................. | B62D 3/126 74/457 |
| 2016/0001352 A1* | 1/2016 | Hagiwara | ................ | B62D 3/12 74/422 |
| 2017/0008551 A1* | 1/2017 | Mizushima | ............ | B62D 3/126 |
| 2018/0221938 A1* | 8/2018 | Mizutani | .............. | B21K 1/76 |
| 2018/0257696 A1* | 9/2018 | Ikeda | .................... | B62D 3/126 |

FOREIGN PATENT DOCUMENTS

| | | | | |
|---|---|---|---|---|
| JP | 3-138042 A | | 6/1991 | |
| JP | 2008-137473 A | | 6/2008 | |
| JP | 2008-138864 A | | 6/2008 | |
| JP | 2009-264452 A | | 11/2009 | |
| JP | 2014-005839 A | | 1/2014 | |
| JP | 2014005839 A | * | 1/2014 | ............ F16H 55/26 |
| WO | 2015/111595 A1 | | 7/2015 | |

OTHER PUBLICATIONS

Written Opinion for PCT/JP2016/074789 dated Sep. 20, 2016 [PCT/ISA/237].

Communication dated Apr. 2, 2019, from the European Patent Office in counterpart European Application No. 16839342.9.

* cited by examiner

FIG. 13
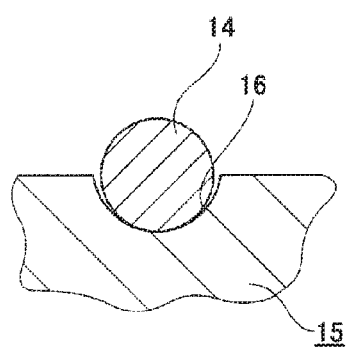
Fig. 13(A)
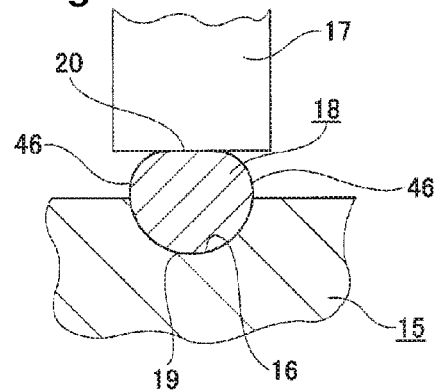
Fig. 13(B)
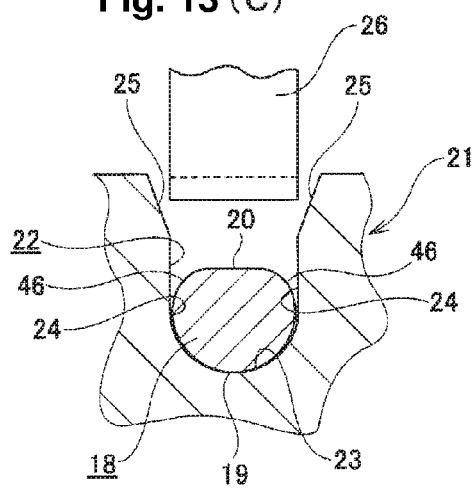
Fig. 13(C)
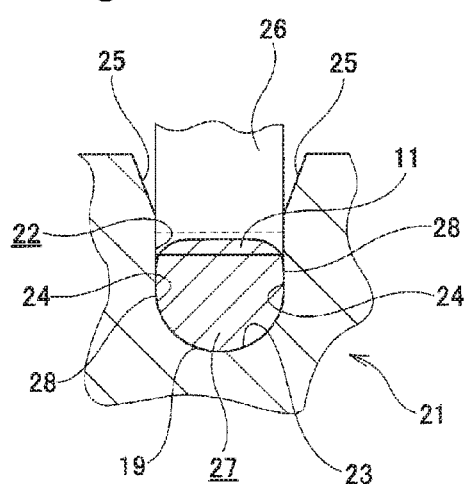
Fig. 13(D)
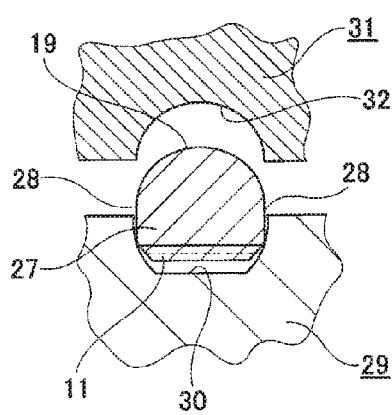
Fig. 13(E)
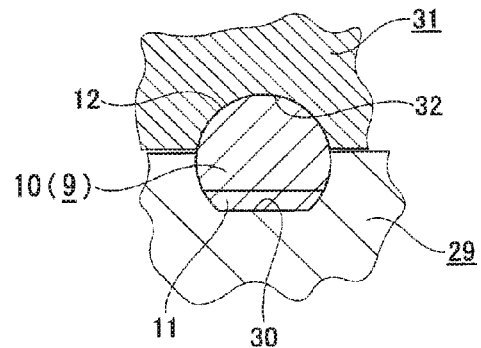
Fig. 13(F)

FIG. 14
Fig. 14(A)
Fig. 14(B)
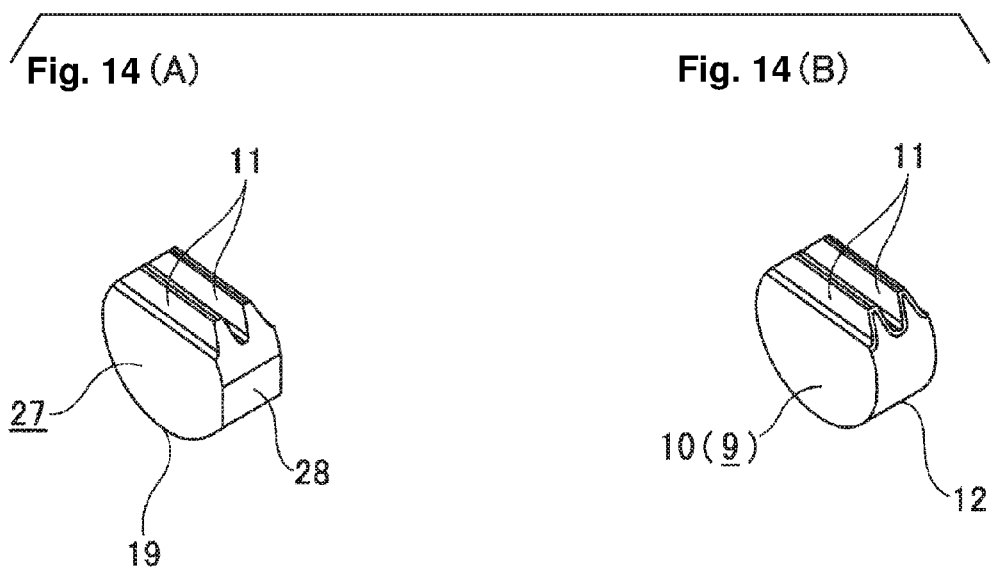
FIG. 15
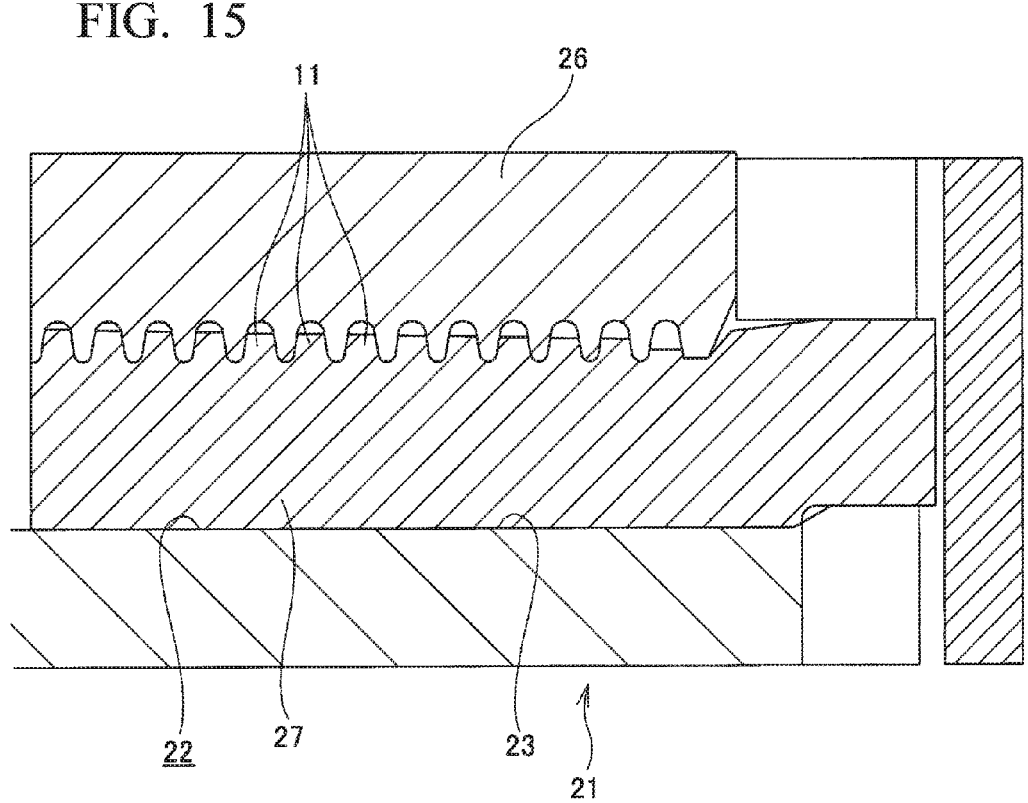

STEERING RACK AND MANUFACTURING METHOD THEREFOR

CROSS REFERENCE TO RELATED APPLICATIONS

This application is a National Stage of International Application No. PCT/JP2016/074789filed Aug. 25, 2016, claiming priority based on Japanese Patent Application No. 2015-165384filed Aug. 25, 2015, the contents of all which are incorporated herein by reference in their entirety.

TECHNICAL FIELD

The present invention relates to, for example, a steering rack incorporated into a steering gear that constitutes a steering apparatus for an automobile and configured to push and pull a tie rod according to displacement in an axial direction, and improvement of a method of manufacturing the same.

Priority is claimed on Japanese Patent Application No. 2015-165384, filed Aug. 25, 2015, the content of which is incorporated herein by reference.

BACKGROUND ART

For example, in a steering apparatus for applying a steering angle to steered wheels of an automobile as shown in FIG. 8 (except for special vehicles such as a forklift or the like, in general, to front wheels), movement of a steering shaft 2 that is rotated according to an operation of a steering wheel 1 is transmitted to an input shaft 6 of a steering gear unit 5 via universal joints 3 and 3 and an intermediate shaft 4. The steering gear unit 5 includes a pinion driven to be rotated by the input shaft 6, and a rack meshed with the pinion. When the pinion is rotated with the input shaft 6, the rack is displaced in an axial direction, a pair of tie rods 7 and 7 coupled to both of end portions thereof are pushed and pulled, and a desired steering angle is applied to the steered wheels.

A plurality of rack teeth are formed in a portion of one side surface in a radial direction of the rack that constitutes the steering gear unit 5 at equal intervals in the axial direction. When such a rack is manufactured by forming a plurality of rack teeth through cutting of a metal material, manufacturing costs are high, and also, it is difficult to secure strength and rigidity for the rack teeth. On the other hand, when the plurality of rack teeth are formed by plastically deforming the material, the time consumed in processing the rack teeth can be decreased to reduce manufacturing costs, and further, it is easy to secure strength and rigidity for the rack teeth because a metal structure of the obtained rack teeth becomes precise. In this way, the inventions disclosed in Patent Documents 1 to 2 are known in the related art as inventions that relate to a method of manufacturing a rack processed by plastic deformation of rack teeth.

CITATION LIST

Patent Document

[Patent Document 1]
Japanese Unexamined Patent Application, First Publication No. 2008-138864
[Patent Document 2]
Japanese Unexamined Patent Application, First Publication No. 2014-5839

SUMMARY OF INVENTION

Technical Problem

An aspect of the present invention is to provide a steering rack and a method of manufacturing the same that facilitate securing form accuracy of rack teeth.

Solution to Problem

A steering rack according to an aspect of the present invention includes a rack shaft; a plurality of rack teeth that is formed on the rack shaft and that has a tooth trace inclined with respect to a first direction perpendicular to an axial direction of the rack shaft; and dummy tooth aligned with the rack teeth on the rack shaft.

In an example, the rack teeth are formed on one side surface in a radial direction of a portion of the rack (a portion of an outer circumferential surface) in the axial direction while being inclined with respect to a direction perpendicular to the axial direction of the rack shaft. In the example, the rack teeth can be formed by performing plastic working such as forging or the like on one side surface in the radial direction of the portion of the rack in the axial direction. In the example, the dummy tooth may be formed on a portion of one side surface of the rack in the radial direction deviated from the portion on which the rack teeth are formed in the axial direction while being aligned with the rack teeth. For example, the dummy tooth can be formed at the same time as the rack teeth are formed by plastic working (in the same process).

In an embodiment, the dummy tooth can be formed to be non-uniform in a second direction parallel to the tooth trace of the rack tooth.

In an example, a substantial inclination angle of a tooth trace of the dummy tooth with respect to the first direction may be different from an inclination angle of the tooth trace of the rack teeth with respect to the first direction. For example, an angle formed between a virtual plane perpendicular to the axial direction and a direction in which the dummy tooth are formed may be smaller than an angle between the virtual plane and a direction in which the rack teeth are formed.

Alternatively and/or additionally, a dummy tooth may have a first side surface relatively close to the rack teeth and a second side surface relatively far from the rack teeth, and an inclination angle of the first side surface with respect to the first direction may be substantially different from an inclination angle of the second side surface with respect to the first direction. For example, an angle formed between the virtual plane perpendicular to the axial direction and a far-side edge far from the rack teeth among both of side edges of the dummy tooth in a widthwise direction (both of side edges of the rack in the axial direction) may be smaller than an angle formed between the virtual plane and a near-side edge close to the rack teeth. In this case, a tooth thickness of the dummy tooth (a thickness dimension in the axial direction) reduces from one side toward the other side of the dummy tooth in the forming direction.

Alternatively and/or additionally, a transition portion between a wall (a tooth surface) of the dummy tooth and another wall (surface) aligned with the wall (the tooth surface) of the dummy tooth may have a curved surface. For example, a portion of one side surface of the rack in the radial direction adjacent to the dummy tooth in the axial direction (including a bottom land present between the dummy teeth) may have a curved surface having a partially arc-shaped cross section. In this case, a tooth surface and a tooth crest of the dummy tooth may have a curved surface having a partially arc-shaped cross section.

Alternatively and/or additionally, at least one slit or at least one concave section may be formed in the dummy tooth. For example, slits may be formed at one to a plurality of places in an intermediate section of the dummy tooth in the forming direction while passing through the dummy tooth in the axial direction. In this case, the number, a shape, a width dimension, and so on, of the slits can be adjusted such that an area of planar portions present in a portion adjacent to the portion on which the rack teeth are formed in the axial direction are substantially the same on both side portions of a virtual plane including a central axis of the rack and perpendicular to the planar portion.

These aspects may be realized singly or may be realized in combination with each other. A shape of the dummy tooth can be devised such that the area of a planar portion present in the portion adjacent to the portion on which the rack teeth are formed in the axial direction is substantially equal on both side portions of a virtual plane including the central axis of the rack and perpendicular to the planar portion, or, planar portions are not continuous lengthwise in the axial direction of the rack.

A method of manufacturing a rack according to another aspect of the present invention is provided to manufacture the above-mentioned steering rack, and includes, after forming a surface portion to be processed having a flat surface shape on a portion of a material in the axial direction, forming the rack teeth and the dummy teeth by plastically deforming the surface portion to be processed by pressing a punch or a mold having a rack-shaped processing surface against the surface portion to be processed.

BRIEF DESCRIPTION OF DRAWINGS

FIG. 13(A)-(13(F) are cross-sectional view showing an example of a method of manufacturing a steering rack seen from the same direction as in FIG. 12.

FIG. 14(A) and 14(B) are partial perspective view showing a shape of rack teeth before and after sizing.

FIG. 15 is a cross-sectional view for describing a method of manufacturing a steering rack.

DESCRIPTION OF EMBODIMENTS

Figure 1:
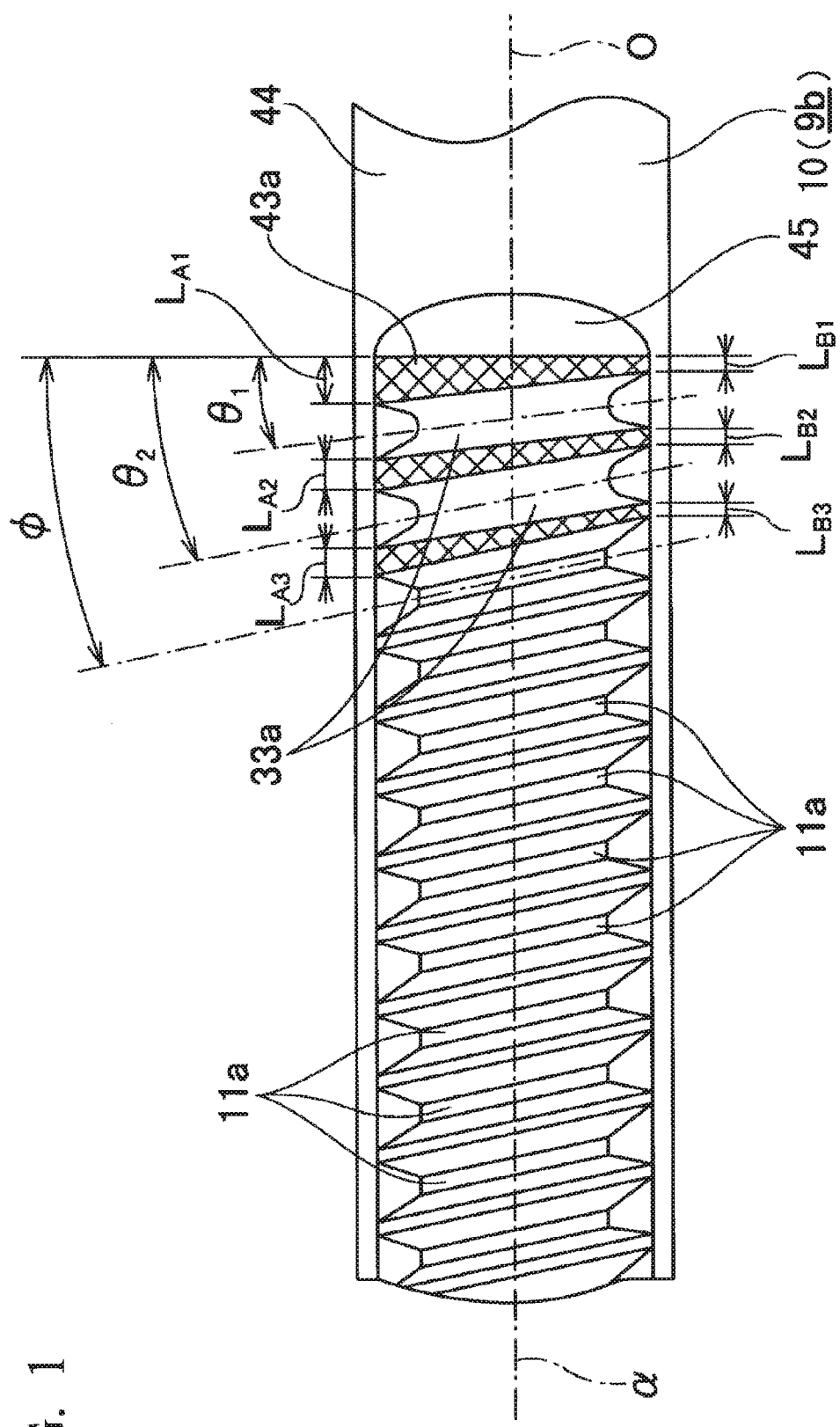
FIG. 1 is an enlarged plan view of an example of a steering rack, showing a major part thereof.

FIGS. 9 to 14 show an example of a steering rack and a method of manufacturing the same. In the example, a rack (a steering rack) 9 is formed of a metal such as carbon steel, stainless steel, or the like, in a circular columnar shape as a whole. In another example, another material may be used. The rack 9 includes a rack shaft (a main body, a rack main body, a shaft main body) 10, and a plurality of rack teeth 11 and 11 formed by plastically processing one side surface in a radial direction (an upper surface in FIGS. 9 and 11 and a front surface in FIG. 10) of a portion of the rack shaft 10 in the axial direction (a portion close to a left end in FIGS. 9 to 11). In the case of the example shown, among a part of the rack 9 (the rack shaft 10) in the axial direction, a radius of curvature $R_{12}$ (see FIG. 12) of a cross-sectional shape of a back surface portion 12 deviated from a portion at which the rack teeth 11 and 11 are formed in the circumferential direction is larger than a radius of curvature $r_{13}$ (see FIG. 12) of an outer circumferential surface of a circular pole section 13 having a circular cross section and that is a remaining portion of the rack 9 (the rack shaft 10) in the axial direction (a right side portion in FIGS. 9 to 11) ($R_{12} > r_{13}$). According to such a structure, the steering rack is made lightweight and excessive increase in outer diameter of a portion other than that in which the rack teeth 11 and 11 are formed is prevented while all of a sufficient width dimension, strength and rigidity of the rack teeth 11 and 11 are secured.

Next, an example of the method of manufacturing the rack (the steering rack) 9 will be described with reference to FIGS. 13 and 14. First, as shown in part (A) of FIG. 13, a material 14 formed of a metal material such as carbon steel, stainless steel, or the like, in a columnar shape or a cylindrical shape is set (placed) in a concave groove section 16 having an arc-shaped cross section formed on an upper surface of a receiving mold 15. Next, as shown in part (B) of FIG. 13, up-setting of strongly pressing the material 14 toward the concave groove section 16 using a tip surface (a lower end surface) of a pressing punch 17 elongated along the concave groove section 16 is performed. In the up-setting, a portion of the material 14 in the axial direction {a portion for forming the rack teeth 11 and 11 (see FIGS. 9 to 12)} is crushed in an upward/downward direction and a width dimension is expanded in a horizontal direction in order to form an intermediate material 18. The intermediate material 18 includes a partial cylindrical surface section 19 that becomes the back surface portion 12 (see FIGS. 9, 11 and 12) on an outer circumferential surface of a portion in the axial direction, a surface portion to be processed 20 having a flat surface shape present opposite to the partial cylindrical surface section 19 in a radial direction of a cross section, and a pair of curved surface sections 46 and 46 configured to connect both of the surface sections 19 and 20 and having a relatively small radius of curvature.

Next, the intermediate material 18 is extracted from the concave groove section 16 of the receiving mold 15 and, as shown in part (C) of FIG. 13, inserted (set) into a bottom section 23 of a holding hole 22 formed in a die 21. The holding hole 22 has a U-shaped cross section, and a radius of curvature of the bottom section 23 is substantially equal to a radius of curvature of an inner surface of the concave groove section 16 of the receiving mold 15. In addition, a pair of inner side surfaces 24 and 24 of the holding hole 22 are planes parallel to each other. Further, a pair of guide inclination surface sections 25 and 25 that are inclined in directions in which an interval therebetween increases toward an upper side are formed on an upper end opening section of the holding hole 22.

When the intermediate material 18 is set in the holding hole 22 of the die 21, next, as shown in part (C) of FIG. 13→part (D) of FIG. 13, a tooth forming punch 26 is inserted into the holding hole 22. The intermediate material 18 is strongly pushed into the holding hole 22 by the tooth forming punch 26. A waveform concavo-convex section for molding having a shape matching the rack teeth 11 and 11 to be obtained is formed on a processing surface (a lower surface) of the tooth forming punch 26. In addition, an outer circumferential surface of the intermediate material 18 is restricted by the inner surface of the holding hole 22 except for the surface portion to be processed 20 that is to form the rack teeth 11 and 11. For this reason, as the intermediate material 18 is strongly pushed into the holding hole 22 by the tooth forming punch 26, the surface portion to be processed 20 in the intermediate material 18 is plastically deformed according to the waveform concavo-convex section. As a result, a bare rack 27 having the rack teeth 11 and 11 as shown in part (D) of FIG. 13 and part (A) of FIG. 14 is processed. However, the bare rack 27 in this state has insufficient form accuracy and dimensional accuracy compared to the rack 9 (see FIGS. 9 to 12) in a completed state, and edges of the rack teeth 11 and 11 also remain sharp. In addition, since excess metal pushed out (of a portion to be a tooth bottom) according to processing of the rack teeth 11 and 11 is strongly pressed against the pair of inner side surfaces 24 and 24 of the holding hole 22, escape flat surface portions 28 and 28 parallel to each other are formed on both of left and right side surfaces of the bare rack 27.

Here, after the tooth forming punch 26 is raised, the bare rack 27 is extracted from the holding hole 22, and as shown in part (E) of FIG. 13, placed on a concavo-convex surface section 30 for sizing formed on an upper surface of a die 29 for sizing. Here, the bare rack 27 is turned upside down. The concavo-convex surface section 30 for sizing includes a chamfered section with edges of teeth, and has a shape matching a shape of the rack teeth 11 and 11 to be obtained (a concavo-convex shape is reversed with respect to a shape after completion). Then, as shown in part (E) of FIG. 13→part (F) of FIG. 13, a portion of the bare rack 27 in which the rack teeth 11 and 11 are formed is strongly pressed toward the concavo-convex surface section 30 for sizing by a mold 31.

A pressed concave groove 32 having a radius of curvature equal to the radius of curvature $R_{12}$ (see FIG. 12) of the back surface portion 12 of the rack 9 (the rack shaft 10) after completion is formed in a lower surface of the mold 31. The bare rack 27 is strongly pressed against the concavo-convex surface section 30 for sizing in a state in which a portion to be the back surface portion 12 is fitted into the pressed concave groove 32. For this reason, in a state in which the die 29 for sizing has substantially approached the mold 31 as shown in part (F) of FIG. 13, a shape and dimensions are also appropriate in the back surface portion 12 at the same time as the rack teeth 11 and 11 are in a state after completion shown in part (B) of FIG. 14 (a state in which a shape and dimensions are appropriate and a chamfer is formed on an edge of each of the teeth). The excess metal pushed out according to the sizing performed in this way gathers at portions of both of the escape flat surface portions 28 and 28. Accordingly, hardly any of both of the escape flat surface portions 28 and 28 remain in the rack 9 (the rack shaft 10) after completion. However, since the excess metal does not press extremely strongly on the concavo-convex surface section 30 for sizing or the inner surface of the pressed concave groove 32, it is easy to not only reduce a processing load of the sizing to a low level but also secure durability of the die 29 for sizing and the mold 31.

Figure 8:
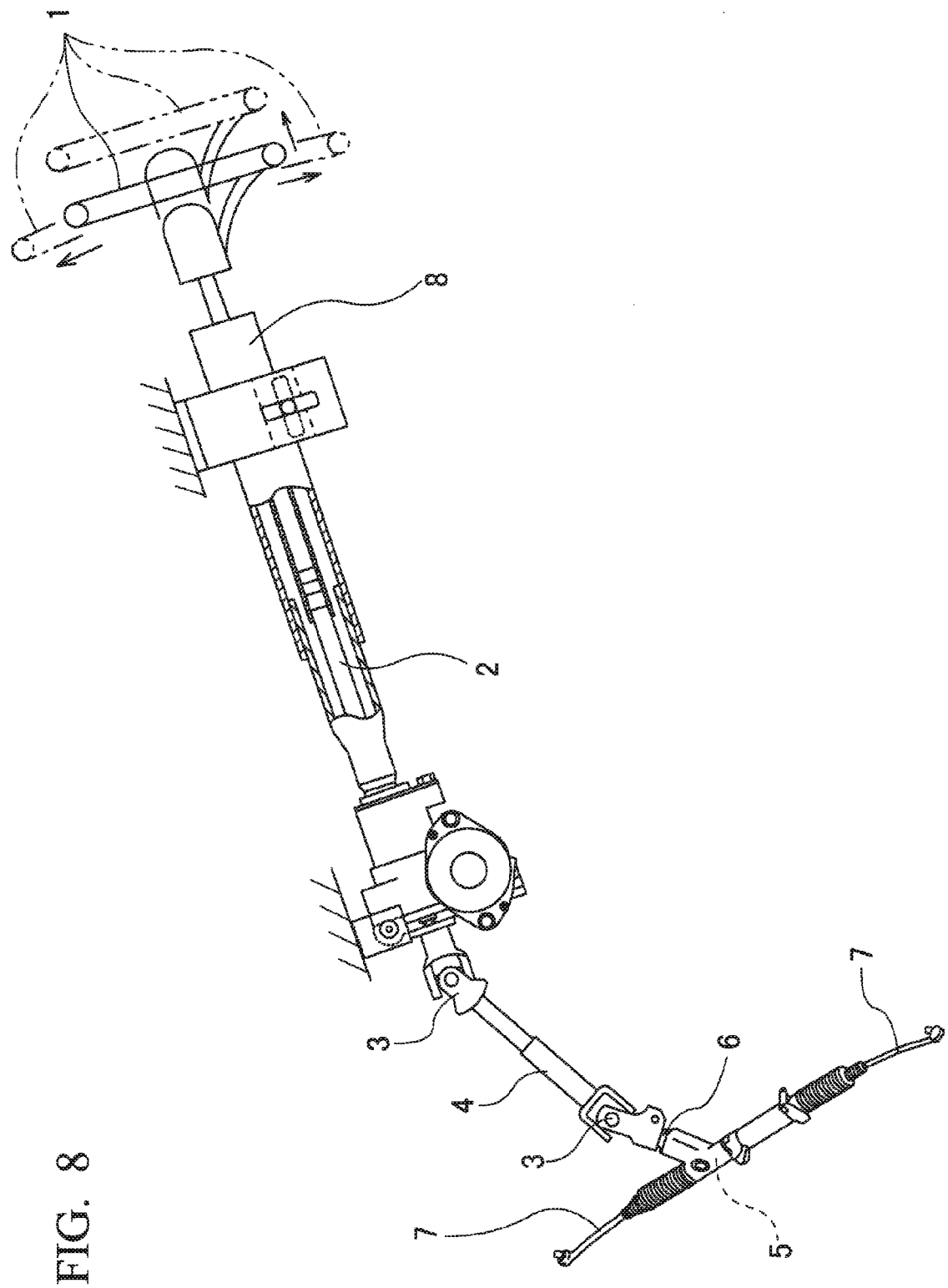
FIG. 8 is a partial cross-sectional view showing an example of a steering apparatus for an automobile including a steering gear into which a rack is incorporated.
Figure 9:
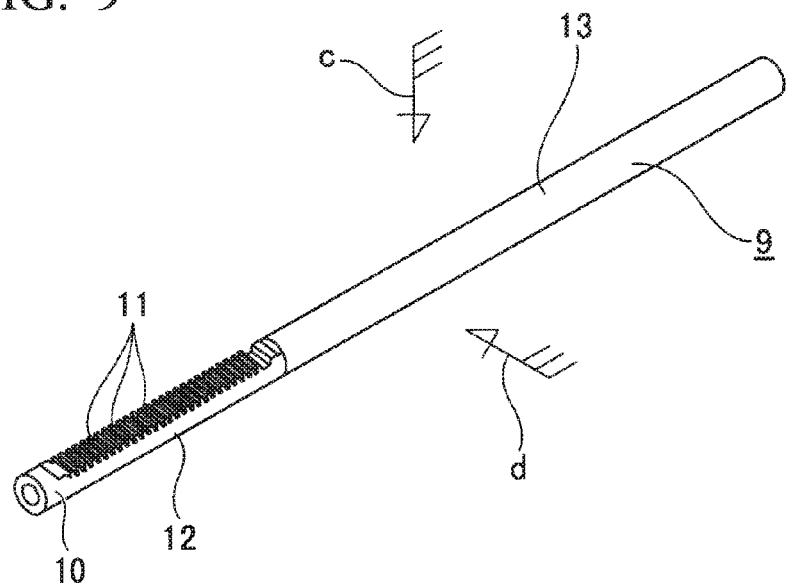
FIG. 9 is a perspective view showing a structure of a steering rack as a whole.
Figure 10:
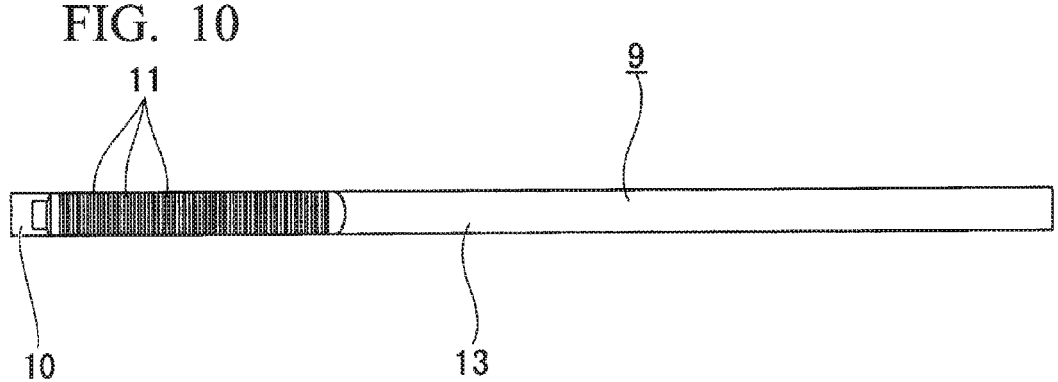
FIG. 10 is a view from an arrow c in FIG. 9.
Figure 11:
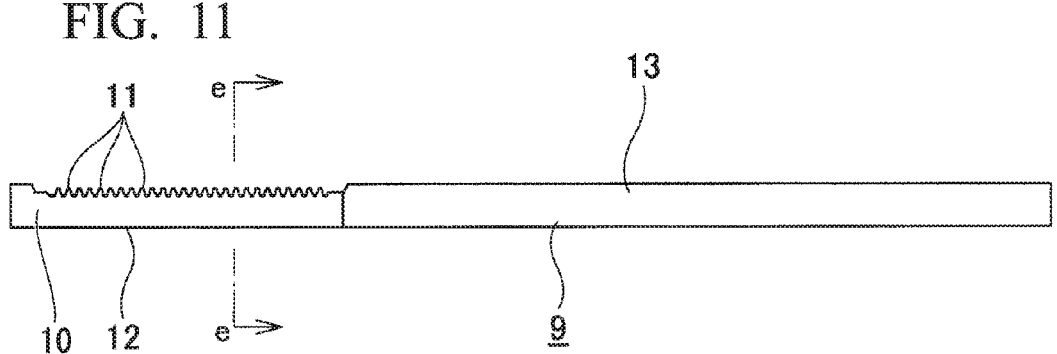
FIG. 11 is a view from an arrow d in FIG. 9.
Figure 12:
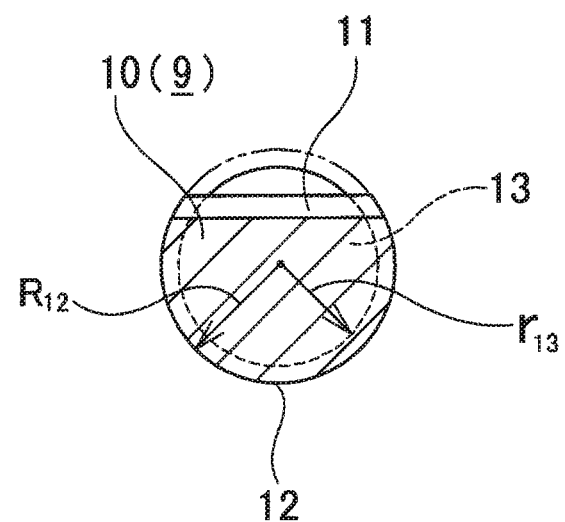
FIG. 12 is an enlarged cross-sectional view taken along line e-e in FIG. 11.

In the above-mentioned example, as shown in part (C) of FIG. 13→part (D) of FIG. 13, when the intermediate material 18 is strongly pushed into the holding hole 22 by the tooth forming punch 26, a portion of the metal material that constitutes the intermediate material 18 is moved from an end portion of the portion in the axial direction that is to form the rack teeth 11 and 11 toward an outside in the axial direction (a portion deviated from the portion pressed by the tooth forming punch 26 in the axial direction) according to the pressing of the tooth forming punch 26. As a result, as shown in FIG. 15, a tooth depth of the rack tooth 11 present at an end portion in the axial direction of the rack teeth 11 and 11 (a right end portion in FIG. 15) is likely to be reduced (a tooth height is likely to be low). In this case, when the rack after completion is assembled to the steering gear unit 5 (see FIG. 8), a meshed state between the rack teeth 11 and 11 and a pinion formed on the outer circumferential surface of the input shaft 6 (see FIG. 8) at an end portion in the axial direction may not be appropriately maintained.

FIGS. 16 to 19 show another example of a steering rack including a dummy tooth and a method of manufacturing the same. In the example, a dummy tooth (an excess metal portion) having a tooth depth smaller than that of the rack teeth is formed on a portion of one side surface in the radial direction deviated in the axial direction from the portion on which the rack teeth are formed while being arranged parallel to the rack teeth. In the example, a plurality of rack teeth 11a and 11a are formed on one side surface in the radial direction (a front surface in FIG. 16) of a portion of the rack shaft 10 in the axial direction by plastic working in a direction inclined with respect to a direction (an upward/downward direction in FIG. 16) perpendicular to a central axis O of the rack 9a (the rack shaft 10). In addition, a plurality of (in the case of the example shown, 2) dummy teeth 33 and 33 having a tooth depth smaller than that of the rack teeth 11a and 11a are formed on a portion, existing at one side of a portion to which the rack teeth 11a and 11a are formed among the one side surface of the rack 9a (the rack shaft 10) in the radial direction, in a same direction in which the rack teeth 11a and 11a are formed while being arranged parallel to the rack teeth 11a and 11a. The dummy teeth 33 and 33 are not substantially meshed with the pinion formed on the outer circumferential surface of the input shaft 6 even in a usage state of the steering gear unit 5 (see FIG. 8).

Figure 17:
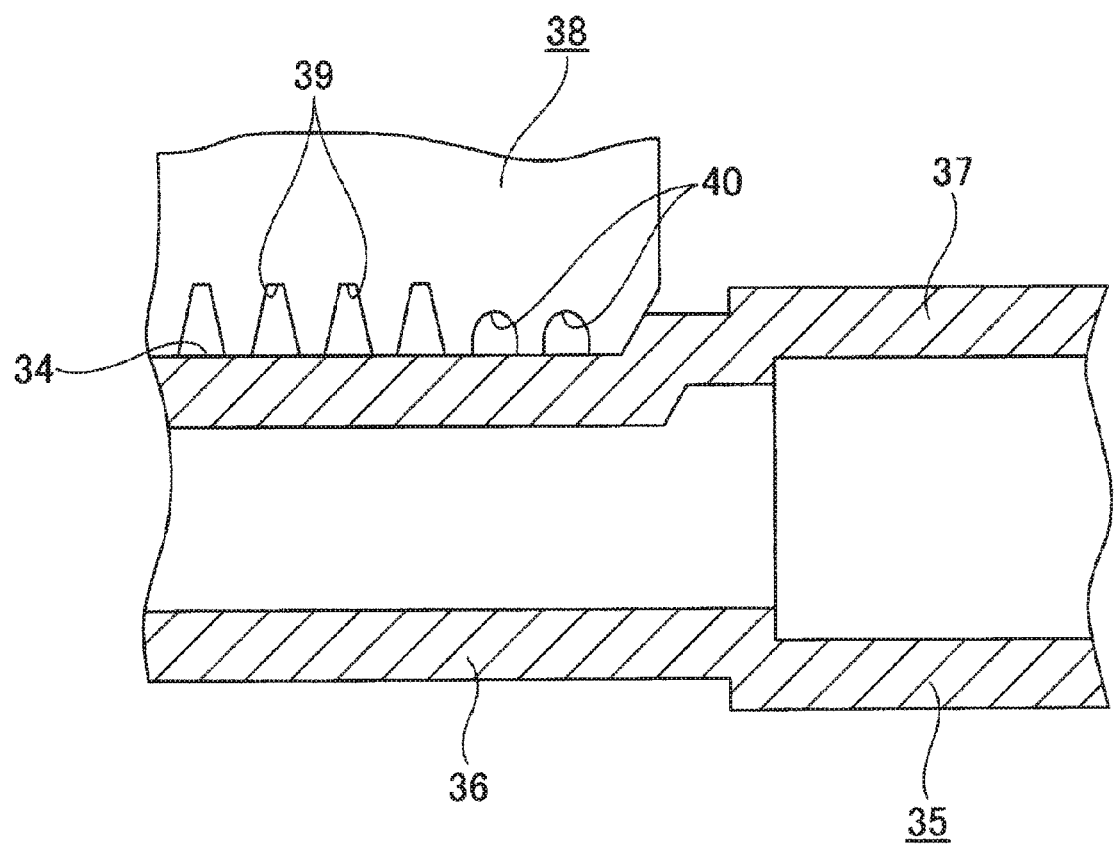
FIG. 17 is a cross-sectional view for describing a method of manufacturing a steering rack, showing a state in which a cast abuts a flat surface portion of a material.
Figure 18:
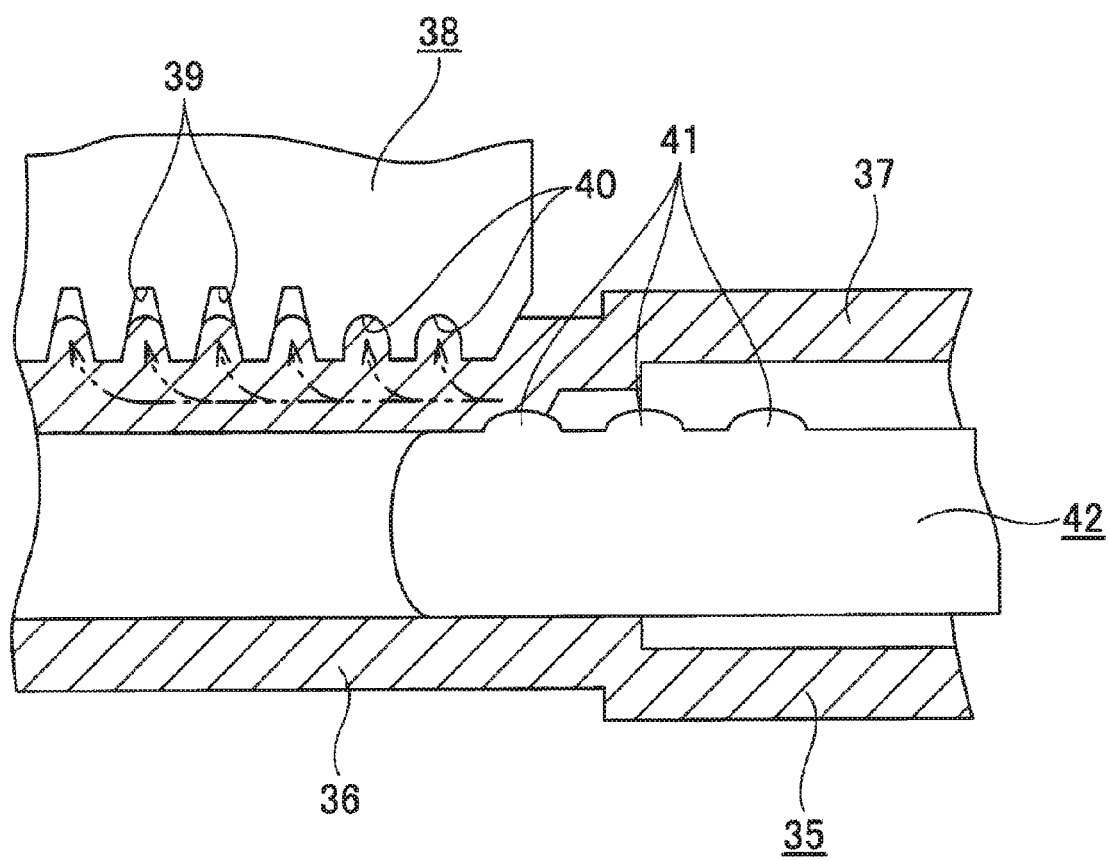
FIG. 18 is a cross-sectional view showing a state in which a metal core is press-fitted into a small diameter-side cylindrical section.
Figure 19:
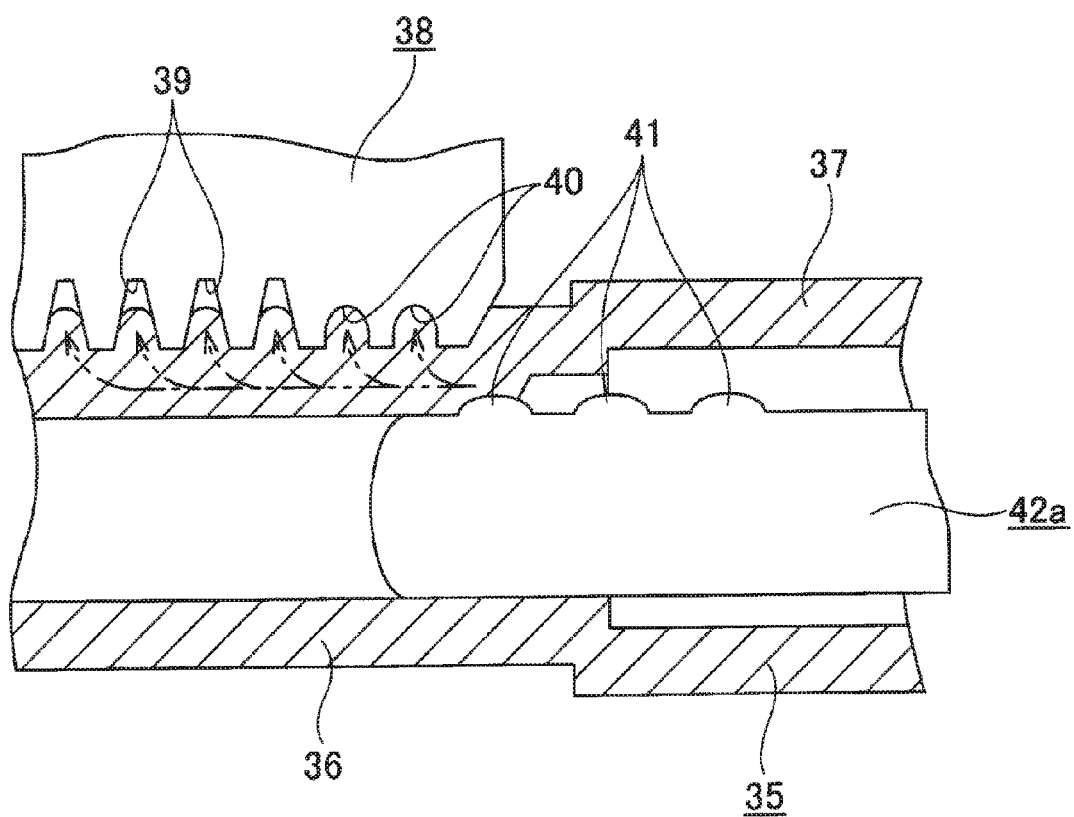
FIG. 19 is a cross-sectional view showing a state in which a metal core having a large outer diameter is press-fitted into a small diameter-side cylindrical section.

In manufacturing the above-mentioned rack 9a, first, as plastic working is performed on a cylindrical member formed of a metal, a cylindrical material 35 having a surface portion to be processed 34 formed in a flat surface on one side surface in the radial direction (an upper surface in FIGS. 17 to 19) of a portion of rack 9a in the axial direction is obtained. In the case of the example shown, in the portion of the material 35 in the axial direction, a radius of curvature of a cross-sectional shape of a small diameter-side cylindrical section 36 that is a portion deviated from the surface portion to be processed 34 in the circumferential direction is smaller than a radius of curvature of a cross-sectional shape of a large diameter-side cylindrical section 37 that is a remaining portion of the material 35 in the axial direction. Next, as shown in FIG. 17, the surface portion to be processed 34 of the material 35 is made to abut against a cast 38 having a concavo-convex shape matching the dummy teeth 33 and 33 and the rack teeth 11a and 11a. That is, the cast 38 is installed in a state in which rack teeth forming concave sections 39 and 39 having shapes matching the rack teeth 11a and 11a and dummy teeth forming concave sections 40 and 40 having shapes matching the dummy teeth 33 and 33 are recessed from lower surfaces, respectively. Next, as shown in FIG. 18, a metal core 42 having convex sections 41 and 41 formed on one side surface in the radial direction is inserted into the material 35 from an opening on one side in the axial direction (a right side in FIGS. 17 to 19), and press-fitted into the small diameter-side cylindrical section 36. Accordingly, a metal material present on an inner diameter side of the surface portion to be processed 34 among the metal material that constitutes the material 35 is moved into the rack teeth forming concave sections 39 and 39 and the dummy teeth forming concave sections 40 and 40. Further, as shown in FIG. 19, the metal core 42 is exchanged with a metal core 42a having an outer diameter larger than that of the metal core 42, and when the metal core 42a is press-fitted into the small diameter-side cylindrical section 36, the rack teeth forming concave sections 39 and 39 and the dummy teeth forming concave sections 40 and 40 are filled with a metal material present on an inner diameter side of the surface portion to be processed 34 to form the rack teeth 11a and 11a and the dummy teeth 33 and 33.

In the case of the example of the rack 9a, there is a room for improvement from the viewpoint of facilitating securing form accuracy of the rack teeth 11a and 11a. That is, the rack 9a is formed in a direction in which the rack teeth 11a and 11a and the dummy teeth 33 and 33 are inclined with respect to a virtual plane perpendicular to the rack 9a (the rack shaft 10) in the axial direction. For this reason, a flat surface portion 43 present at a portion adjacent to one side in the axial direction of the dummy tooth 33 on one side in the axial direction of the dummy teeth 33 and 33 has a trapezoidal shape having a width dimension (a dimension of the rack 9a in the axial direction) from one side to the other side in a direction perpendicular to the central axis O of the rack 9a (a direction perpendicular to the central axis O on a virtual plane parallel to the flat surface portion 43) (from an upper side toward a lower side in FIG. 16). In other words, an axial dimension $L_A$ of one edge (an upper edge in FIG. 16) of the flat surface portion 43 in a direction perpendicular to the central axis O of the rack 9a is larger than an axial dimension $L_B$ of the other edge (a lower edge in FIG. 16) ($L_A > L_B$). Here, during plastic working such as forging or the like, a resistance (a flow resistance) with respect to movement of the metal material is smaller than that of the other portions at a portion in the vicinity of a flat surface parallel to a moving direction of the metal material (the metal material moves easily). In short, as shown in FIGS. 18 and 19, when the rack teeth 11a and 11a and the dummy teeth 33 and 33 are formed by press-fitting the metal cores 42 and 42a into the small diameter-side cylindrical section 36 of the material 35, the resistance with respect to movement of the metal material that constitutes the material 35 is similarly smaller than that of the other end side on one end side in the perpendicular direction among the portion in the vicinity of the flat surface portion 43. Accordingly, when the rack teeth 11a and 11a and the dummy teeth 33 and 33 are formed by press-fitting the metal cores 42 and 42a, the metal material on one end side of the portion in the vicinity of the flat surface portion 43 is easily moved from the inner diameter side of the surface portion to be processed 34 toward the large diameter-side cylindrical section 37, and there is a possibility that it may be difficult to fill the rack teeth forming concave sections 39 and 39 and the dummy teeth forming concave sections 40 and 40 with the metal material.

In the example (the rack 9b) shown in FIG. 1, shapes of dummy teeth 33a and 33a are devised. When the rack teeth 11a and 11a and the dummy teeth 33a and 33a are formed by plastic working, a resistance (a flow resistance) with respect to movement of the metal material that constitutes the rack 9b is adjusted, and form accuracy of the rack teeth 11a and 11a is easily obtained.

In the rack 9b in FIG. 1, the plurality of the rack teeth 11a and 11a are formed on one side surface (a front surface in FIG. 1) in the radial direction of a portion of the rack shaft 10 in the axial direction while being inclined with respect to a virtual plane perpendicular to the axial direction of the rack 9b (the rack shaft 10). The rack tooth 11a is formed on the rack shaft 10 and has a tooth trace (a tooth line) inclined with respect to a first direction perpendicular to the axial direction of the rack shaft 10. Also, a plurality of (in the case of the example shown, 2) dummy teeth 33a and 33a having a tooth depth smaller than that of the rack teeth 11a and 11a are formed on a portion disposed at one side (a right side in FIG. 1) in the axial direction of a portion of the rack 9b on which the rack teeth 11a and 11a are formed while being aligned parallel with the rack teeth 11a and 11a. The dummy teeth 33a and 33a are not substantially meshed with the pinion teeth formed on the outer circumferential surface of the input shaft 6 even in a usage state of the steering gear unit 5 (see FIG. 8) into which the rack 9b is incorporated.

Figure 16:
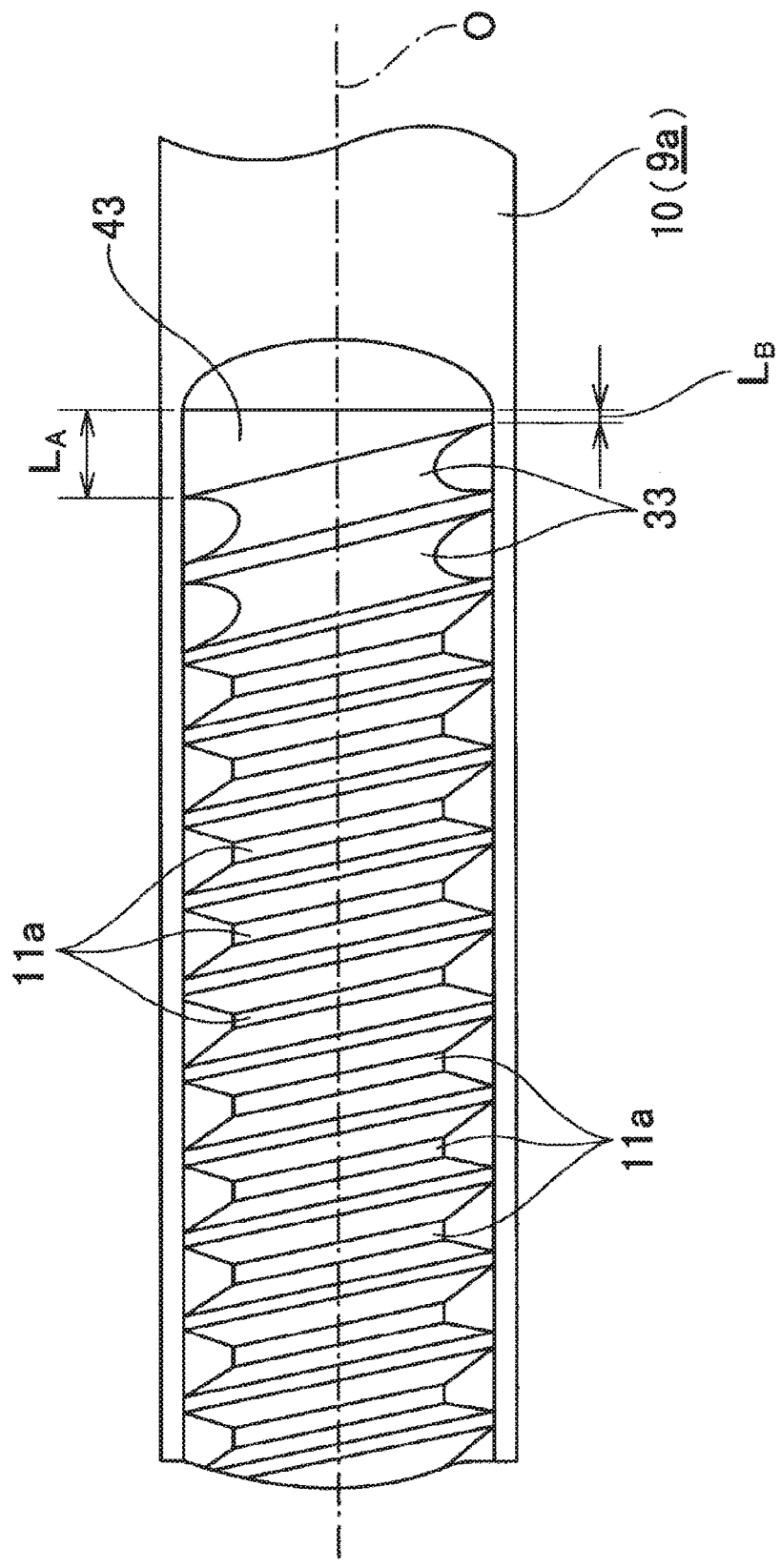
FIG. 16 is an enlarged plan view showing an example of the steering rack, showing a major part thereof.

In particular, in the rack 9b in the example, planar portions shown by inclined lattice shapes in FIG. 1 and present on one side in the axial direction of a portion of one side surface in the radial direction on which the rack teeth 11a and 11a are formed (portions between the rack teeth 11a and 11a and the dummy teeth 33a and 33a, portions between the dummy teeth 33a and 33a, and a portion between the dummy teeth 33a and 33a and an inclined surface section 45 to be described below) are not continuous lengthwise in the axial direction of the rack 9b (continuous lengths in the axial direction are smaller than that of the flat surface portion 43 of the rack 9a shown in FIG. 16 described above). For this reason, in the example, angles $\theta_1$ and $\theta_2$ formed between the virtual plane perpendicular to the axial direction of the rack 9b and the forming direction (tooth traces, apex sections, or ridges) of the dummy teeth 33a and 33a are smaller than an angle $\varphi$ also formed between the virtual plane and the forming direction of the rack teeth 11a and 11a. Further, in the case of the example, the angle $\theta_1$ formed between the virtual plane perpendicular with respect to the axial direction of the rack 9b and the forming direction of the dummy tooth 33a (present at a far side from the rack teeth 11a and 11a) on one side in the axial direction is smaller than the angle $\theta_2$ also formed between the virtual plane and the forming direction of the dummy tooth 33a (present at a closer side to the rack teeth 11a and 11a) of the other side in the axial direction ($\varphi > \theta_2 > \theta_1$). The dummy tooth 33a is irregularly (non-uniformly) formed in a second direction parallel to the tooth trace of the rack tooth 11a within a range of the tooth width of the rack tooth 11a (throughout the tooth width of the rack tooth 11a). An inclination angle of the substantial tooth trace (the apex section or the ridge) of the dummy tooth 33a with respect to the first direction is different from an inclination angle (a tilt angle) of the tooth trace of the rack tooth 11a with respect to the first direction. The substantial tooth trace (the apex section or the ridge) of the dummy tooth 33a is not parallel to the tooth trace of the rack tooth 11a. In the example, the inclination angle of the substantial tooth trace (the apex section or the ridge) of the dummy tooth 33a with respect to the first direction is smaller than the inclination angle (the tilt angle) of the tooth trace of the rack tooth 11a with respect to the first direction. In addition, the inclination angle of the substantial tooth trace with respect to the first direction of a dummy tooth 33a relatively far from the rack tooth 11a is smaller than that of a dummy tooth 33a relatively close to the rack tooth 11a. The rack tooth 11a has a uniform longitudinal cross section in the second direction (a longitudinal cross section perpendicular to the second direction) parallel to the tooth trace of the rack tooth 11a within a range of the tooth width of the rack tooth 11a (throughout the tooth width of the rack tooth 11a). In the rack tooth 11a, the longitudinal cross section perpendicular to the second direction is substantially uniform irrespective of a position in the second direction. Meanwhile, the dummy tooth 33a has a non-uniform longitudinal cross section in the second direction (the longitudinal cross section perpendicular to the second direction) parallel to the tooth trace of the rack tooth 11a within a range of the tooth width of the rack tooth 11a (throughout the tooth width of the rack tooth 11a) on the basis of the inclination or the like of the substantial tooth trace as described above. For example, the dummy tooth 33a is formed such that a position and/or a shape of the longitudinal cross section perpendicular to the second direction varies in the second direction (the longitudinal cross section is laterally shifted according to the position in the second direction, a shape of the longitudinal cross section of the dummy tooth 33a varies according to the position in the second direction, and so on). In the example, in one side surface of the rack 9b in the radial direction, the flat surface portion 43a present at the portion adjacent to one side in the axial direction of the dummy tooth 33a on one side in the axial direction has a shape closer in approximation to a rectangular shape than the flat surface portion 43 of the rack 9a shown in FIG. 16 as described above. That is, an axial dimension $L_{A1}$ of one edge (an upper side edge in FIG. 1) related to the direction perpendicular to the central axis O of the rack 9b in the flat surface portion 43a (the direction perpendicular to the central axis O on the virtual plane parallel to the flat surface portion 43a) that is a portion of the planar portion in which an axial dimension is largest is smaller than the axial dimension $L_A$ of one edge (an upper edge in FIG. 16) in the direction perpendicular to the central axis O of the rack 9a in the flat surface portion 43 of the rack 9a in FIG. 16 ($L_{A1} < L_A$). In addition, an axial dimension $L_{B1}$ of the other edge (a lower side edge in FIG. 1) of the flat surface portion 43a is substantially equal to an axial dimension $L_B$ of the other edge of the flat surface portion 43 of the rack 9a in FIG. 16 ($L_{B1} = L_B$). Further, the flat surface portion 43a among one side surface of the rack 9b in the radial direction in FIG. 16 and a circular pole section 44 having a circular cross section and is a remaining portion of the rack 9b in the axial direction are connected by the inclined surface section 45 having a bow shape. In the example shown in FIG. 1, the flat surface portion 43b present in the portion between the dummy teeth 33a and 33a and the flat surface portion 43c present in the portion adjacent to the other side in the axial direction of the dummy tooth 33a on the other side in the axial direction have a substantially trapezoidal shape having a width dimension that decreases from one side toward the other side in the direction perpendicular to the central axis O. That is, an axial dimension $L_{A2}$ of one edge of the flat surface portion 43b and an axial dimension $L_{A3}$ of one edge of the flat surface portion 43c are relatively large to an extent that the axial dimension $L_{A1}$ of one edge of the flat surface portion 43a is smaller than the axial dimension $L_A$ of one edge of the flat surface portion 43 of the rack 9a in FIG. 16. On the other hand, an axial dimension $L_{B2}$ of the other edge of the flat surface portion 43b is substantially equal to the axial dimension of the other edge of the portion between the dummy teeth 33 and 33 of the rack 9a in FIG. 16, and an axial dimension $L_{B3}$ of the other edge of the flat surface portion 43c is also substantially equal to the axial dimension of the other edge of the portion adjacent to the other side in the axial direction of the dummy tooth 33 on the other side in the axial direction. In the example shown in FIG. 1, in a state in which an area of the planar portions is substantially equal to that in the rack 9a in FIG. 16, an axial dimension of a continuous portion in the axial direction of the planar portions (the largest dimension, i.e., the axial dimension $L_{A1}$ of one edge of the flat surface portion 43a) is smaller than that in the rack 9a in FIG. 16.

A method of manufacturing a rack (a steering rack) 9b of the example shown in FIG. 1 as described above is, basically, similar to the example shown in FIG. 13 described above or the example shown in FIGS. 17 to 19. In the example, the rack (the steering rack) 9b is manufactured of a metal material such as carbon steel, stainless steel, or the like, by performing plastic working (cold forging) on a columnar or cylindrical material. In other examples, other materials, other shapes, and/or other treatment processes may be used.

That is, for example, as shown in part (A) of FIG. 13→part (B) of FIG. 13, the intermediate material 18 obtained by performing predetermined plastic working on the columnar or cylindrical material 14 may be set in the holding hole 22 of the die 21 as shown in part (C) of FIG. 13→part (D) of FIG. 13. The tooth forming punch 26 is inserted into the holding hole 22. The intermediate material 18 is strongly pushed into the holding hole 22 by the tooth forming punch 26. A waveform concavo-convex portion for molding having a shape matching the rack teeth 11a and 11a and the dummy teeth 33a and 33a that are to be obtained is formed on a processing surface (a lower surface) of the tooth forming punch 26 used in the method of manufacturing the rack 9b of the example. As shown in part (E) of FIG. 13→part (F) of FIG. 13, the rack (the steering rack) 9b is obtained by performing sizing that adjusts shapes of the rack teeth 11a and 11a on the bare rack 27 that is obtained in above mentioned way. The concavo-convex surface section 30 for sizing formed on the upper surface of the die 29 for sizing used in the sizing has a shape matching the rack teeth 11a and 11a and the dummy teeth 33a and 33a that are to be obtained.

Alternatively, as shown in FIGS. 17 to 19, the cast 38 may be made to abut against a surface to be processed 34 of the cylindrical material 35. Both of the rack teeth forming concave sections 39 and 39 having shapes matching the rack teeth 11a and 11a and the dummy teeth forming concave sections 40 and 40 having shapes matching the dummy teeth 33a and 33a are formed in the cast 38 while being recessed from one surface (a lower surface). In this state, as shown in FIGS. 18 and 19, the metal cores 42 and 42a having the convex sections 41 and 41 formed on one side surface in the radial direction are inserted into the material 35. The rack teeth forming concave sections 39 and 39 and the dummy teeth forming concave sections 40 and 40 are also filled with the metal material present on the inner diameter side of the surface portion to be processed 34 among the metal material that constitutes the material 35 as the metal material is moved thereinto. Accordingly, the rack teeth 11a and 11a and the dummy teeth 33a and 33a are formed and the rack (the steering rack) 9b is obtained.

Irrespective of a method employed, according to the rack 9b and the method of manufacturing the same of the example, form accuracy of the rack teeth 11a and 11a can be easily secured. That is, the dummy tooth 33a is non-uniformly formed on the rack 9b in the second direction parallel to the tooth trace of the rack tooth 11a within a range of the tooth width of the rack tooth 11a (throughout the tooth width of the rack tooth 11a). Accordingly, movement of the material during manufacture of the rack 9b is restricted and/or controlled. In the case of the example in FIG. 1, the angles $\theta_1$ and $\theta_2$ formed between the virtual plane perpendicular to the axial direction of the rack 9b (the rack shaft 10) and the forming direction of the dummy teeth 33a and 33a are smaller than the angle $\varphi$ also formed between the virtual plane and the forming direction of the rack teeth 11a and 11a. Planar portions of one side surface of the rack 9b in the radial direction on one side in the axial direction of the portion on which the rack teeth 11a and 11a are formed are not continuous lengthwise in the axial direction of the rack 9b. More specifically, the axial dimension $L_{A1}$ of one edge of the flat surface portion 43a is smaller than the axial dimension $L_A$ of one edge of the flat surface portion 43 of the rack 9a in FIG. 16 ($L_{A1}<L_A$). For example, a resistance (a flow resistance) with respect to movement in the axial direction of the metal material that constitutes the rack 9b at one end side in the portion in the vicinity of the flat surface portion 43a is larger than the flow resistance at one end side of the portion in the vicinity of the flat surface portion 43 of the rack 9a in FIG. 16. Accordingly, when the rack teeth 11a and 11a and the dummy teeth 33a and 33a are formed, it is difficult for the metal material to move from the inner diameter side of the portion that is to form the rack teeth 11a and 11a and the dummy teeth 33a and 33a toward the circular pole section 44 side. That is, the metal material can be easily moved toward the portion to which the rack teeth 11a and 11a and the dummy teeth 33a and 33a will be formed. As a result, the portion can be easily filled with the metal material, and form accuracy of the rack teeth 11a and 11a can be secured. In the case of the example, the manufacturing method of easily securing form accuracy of the rack teeth 11a and 11a is realized by simply changing a shape of the waveform concavo-convex portion formed on the tooth forming punch 26 of the processing surface of the cast 38. Accordingly, manufacturing costs of the rack 9b can be prevented from being wastefully increased.

In the example, the angle $\theta_1$ formed between the virtual plane perpendicular to the axial direction of the rack 9b (the rack shaft 10) and the forming direction of the dummy tooth 33a on one side in the axial direction is smaller than the angle $\theta_2$ also formed between the virtual plane and the forming direction of the dummy tooth 33a on the other side in the axial direction ($\varphi>\theta_2>\theta_1$). A portion having a dimension in the axial direction of the rack 9b that is larger than one edge of the flat surface portion 43a is not present in the planar portion. In this way, an area of the planar portion is substantially the same as that of the rack 9a in FIG. 16, the axial dimension of a portion of the planar portion that is continuous in the axial direction (the largest dimension) is smaller than that in the rack 9a in FIG. 16, and thus, the flow resistance is adjusted (a difference in the flow resistance between one end side portion and the other end side portion in the direction perpendicular to the central axis O of the rack 9b is made small). Reasons for securing form accuracy of the rack teeth 11a and 11a are not limited thereto.

In the case in which the example is realized, the dummy tooth 33a on one side in the axial can be formed such that the angle $\theta_1$ is 0° (the dummy tooth 33a on one side in the axial direction can be formed in the direction perpendicular to the axial direction of the rack 9b). That is, the flat surface portion 43a may be formed in a rectangular shape. When the flat surface portion 43a is formed in a rectangular shape, the area of the flat surface portion 43a can be the same on both sides of a virtual plane a perpendicular to the flat surface portion 43a and passing through the central axis O of the rack 9b. The flow resistance can also be substantially the same on both of the sides. As a result, form accuracy of the rack teeth 11a and 11a is easily secured. The shape of the flat surface portion may be variously varied.

The flow resistance increases as the angles $\theta_1$ and $\theta_2$ formed between the virtual plane perpendicular to the axial direction of the rack 9b and the forming direction of the dummy teeth 33a and 33a becomes smaller. Since the angles $\theta_1$ and $\theta_2$ are smaller than the angle $\varphi$ formed between the virtual plane and the forming direction of the rack teeth 11a and 11a ($\varphi>\theta_2>\theta_1$), a flow resistance of the planar portion can be increased to be larger than in the aspect shown in FIG. 16 as described above. As a result, for example, the metal material cannot be easily moved toward the circular pole section 44, and form accuracy of the rack teeth 11a and 11a can be secured also from this viewpoint.

Figure 2:
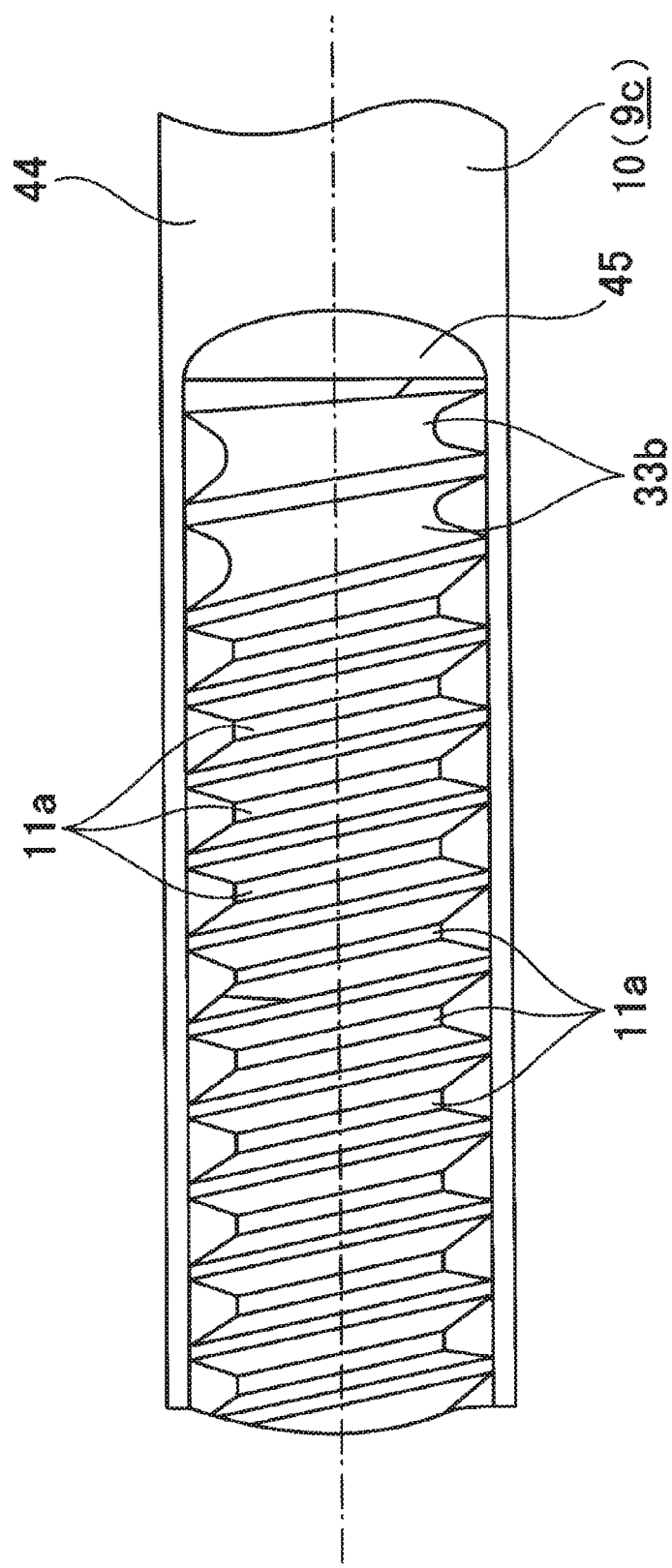
FIG. 2 is an enlarged plan view of an example of the steering rack, showing a major part thereof.

In an example (a rack 9c) shown in FIG. 2, an angle formed between the virtual plane perpendicular to the axial direction of the rack 9c (the rack shaft 10) and one side edge (a side edge far from the rack teeth 11a and 11a) of both of side edges of a plurality of dummy teeth 33b and 33b in the widthwise direction (both of side edges of the rack 9c in the axial direction) is smaller than the angle also formed between the virtual plane and the other side edge (the side edge close the rack teeth 11a and 11a). In other words, a substantial tooth thickness (a wall thickness) of each of the dummy teeth 33b and 33b reduces from one side to the other side (from an upper side to a lower side in FIG. 2) in the forming direction (a direction along tooth traces, apex sections, or ridges) of the dummy teeth 33b and 33b (a thickness of the dummy tooth 33b gradually reduces from one end toward the other end in this direction). In the example, the dummy teeth 33b and 33b have first side surfaces (first tooth surfaces) relatively close to the rack teeth 11a and 11a and second side surfaces (second tooth surfaces) relatively far therefrom in the axial direction of the rack shaft 10, and an inclination angle (a tilt angle) of a first side surface with respect to the first direction perpendicular to the axial direction of the rack shaft 10 is substantially different from an inclination angle of a second side surface with respect to the first direction. In each of the dummy teeth 33b and 33b shown in FIG. 2, the inclination angle of the second side surface (the right side surface in FIG. 2) is smaller than the inclination angle of the first side surface (the left side surface in FIG. 2). Also in this example, the dummy tooth 33b is non-uniformly formed in the second direction parallel to the tooth trace of the rack tooth 11a within a range of the tooth width of the rack tooth 11a (throughout the tooth width of the rack tooth 11a). Accordingly, movement of the material during manufacture of the rack 9c is restricted and/or controlled. The dummy tooth 33b has a non-uniform longitudinal cross section in the second direction (the longitudinal cross section perpendicular to the second direction) parallel to the tooth trace of the rack tooth 11a within a range of the tooth width of the rack tooth 11a (throughout the tooth width of the rack tooth 11a) on the basis of the shape or the like. For example, the dummy tooth 33b may be formed such that a position and/or a shape in the longitudinal cross section perpendicular to the second direction varies in the second direction (the longitudinal cross section is laterally shifted according to the position in the second direction, the shape of the longitudinal cross section of the dummy tooth 33b varies according to the position in the second direction, and so on). In the example, the planar portions, among one side surface of the rack 9c in the radial direction, on one side in the axial direction of the portion on which the rack teeth 11a and 11a are formed are not continuous lengthwise in the axial direction of the rack 9c. Further, in the rack 9c of the example, a length in the axial direction of the planar portions on one side in the axial direction of the portion on which the rack teeth 11a and 11a are formed is smaller than that in the rack 9b in FIG. 1. For example, when the rack 9c is manufactured by plastic working, movement of the metal material that constitutes the rack 9c from the inner diameter side of the portion, that is to form the rack teeth 11a and 11a and the dummy teeth 33b and 33b, toward the circular pole section 44 can be reduced to a low level. As a result, form accuracy of the rack teeth 11a and 11a is easily secured. Further, one side edge of the dummy tooth 33b on one side in the axial direction (a right side in FIG. 2) of the dummy teeth 33b and 33b may be parallel to the virtual plane. A configuration and an action of the other portions are the same as in the example in FIG. 1.

Figure 3:
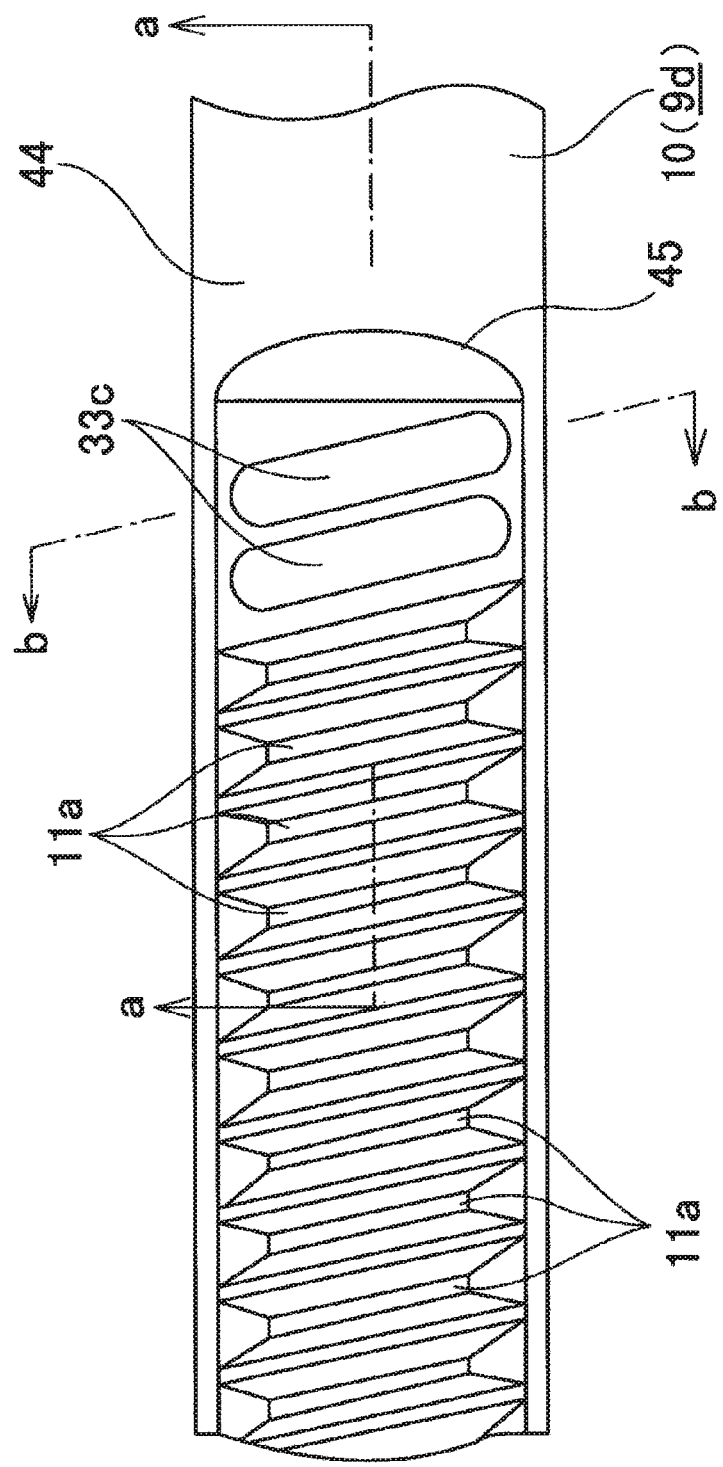
FIG. 3 is an enlarged plan view of an example of the steering rack, showing a major part thereof.
Figure 4:
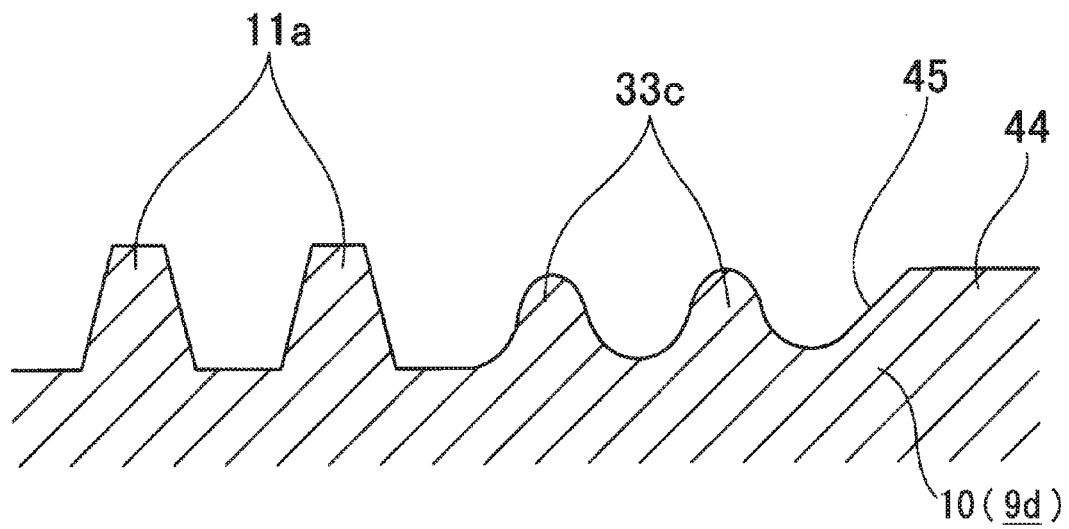
FIG. 4 is a cross-sectional view taken along line a-a in FIG. 3.
Figure 5:
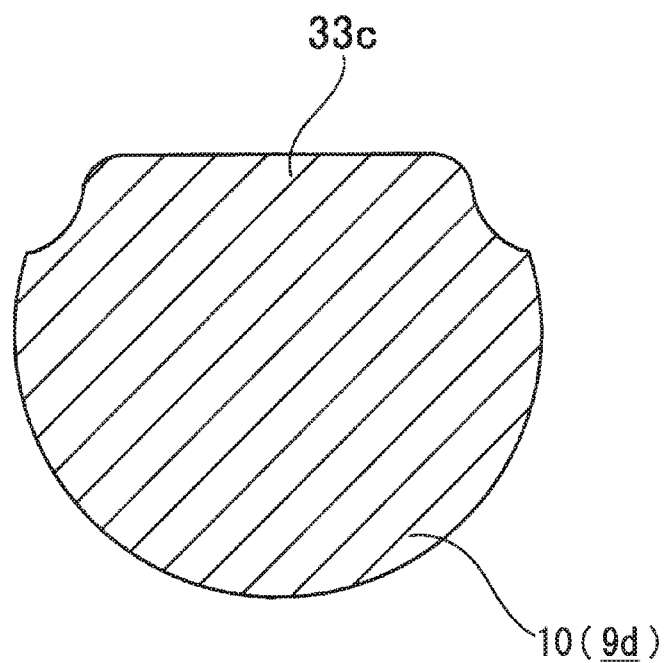
FIG. 5 is a cross-sectional view taken along line b-b in FIG. 3.

In an example (a rack 9d) shown in FIGS. 3, 4 and 5, tooth surfaces, tooth crests and bottom lands of a plurality of dummy teeth 33c and 33c are constituted by curved surfaces having partially arc-shaped cross sections related to the virtual plane perpendicular to the forming direction of the dummy teeth 33c and 33c. Here, the bottom land includes a connecting section (a transition portion) between a base of the dummy tooth 33c on one side in the axial direction of the dummy teeth 33c and 33c (a right side in FIGS. 3 and 4) and the inclined surface section 45, and also a connecting section (a transition portion) between a base of the dummy tooth 33c on the other side in the axial direction (a left side in FIGS. 3 and 4) and the portion adjacent to the other side in the axial direction of the dummy tooth 33c on the other side in the axial direction. Also in the example, the dummy tooth 33c is non-uniformly formed in the second direction parallel to the tooth trace of the rack tooth 11a within a range of the tooth width of the rack tooth 11a (throughout the tooth width of the rack tooth 11a). Accordingly, movement of the material during manufacture of the rack 9d is restricted and/or controlled. The dummy tooth 33c has a non-uniform longitudinal cross section in the second direction parallel to the tooth trace of the rack tooth 11a (the longitudinal cross section perpendicular to the second direction) within a range of the tooth width of the rack tooth 11a (throughout the tooth width of the rack tooth 11a) based on the shape or the like. For example, the dummy tooth 33c may be formed such that a position and/or a shape of the longitudinal cross section perpendicular to the second direction vary in the second direction (a shape of the longitudinal cross section of the dummy tooth 33c varies according to the position in the second direction, and so on). In the example, a transition portion (a bottom land) between a wall (a tooth surface) of one dummy tooth 33c and another wall formed parallel to the wall (the tooth surface) of the dummy tooth 33c (the wall (the tooth surface) of the other dummy tooth 33c or the inclined surface section (another wall surface) 45) has a curved surface (a curved shape, a concave surface, or a concave curved section). In addition, lateral cross sections of the dummy teeth 33c and 33c have substantially curved portions in both of end portions (both sides in the widthwise direction of the tooth) of the dummy teeth 33c and 33c. In the example, the planar portions of one side surface of the rack 9d in the radial direction on one side in the axial direction of the portion on which the rack teeth 11a and 11a are formed are not continuous lengthwise in the axial direction of the rack 9d. Further, in the example, since the tooth surface, the tooth crest and the bottom land of each of the dummy teeth 33c and 33c are formed as curved surfaces, a load when forming the dummy teeth 33c and 33c through plastic working can be reduced to a low level. Since an edge of a tooth tip of the dummy tooth 33c is substantially removed, it becomes easy to fill the mold with the material during manufacture of the rack 9d, and as a result, a load when forming the rack tooth 11a can be reduced. Accordingly, reduction in manufacturing costs of the rack 9d is achieved. In the example, the forming direction of the dummy teeth 33c and 33c can be parallel to the forming direction of the rack teeth 11a and 11a. A configuration and an action of other portions are the same as in the example in FIG. 1 as described above.

Figure 6:
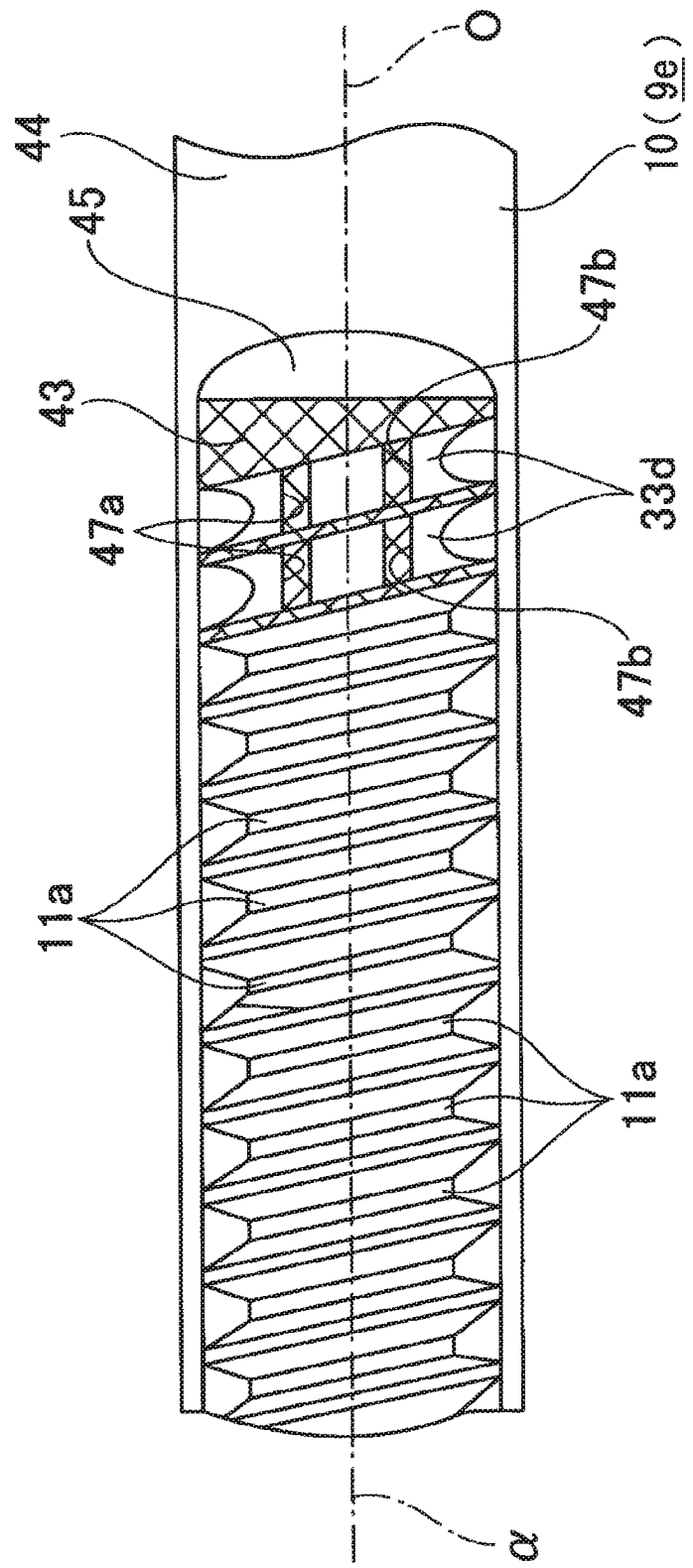
FIG. 6 is an enlarged plan view of an example of the steering rack, showing a major part thereof.
Figure 7:
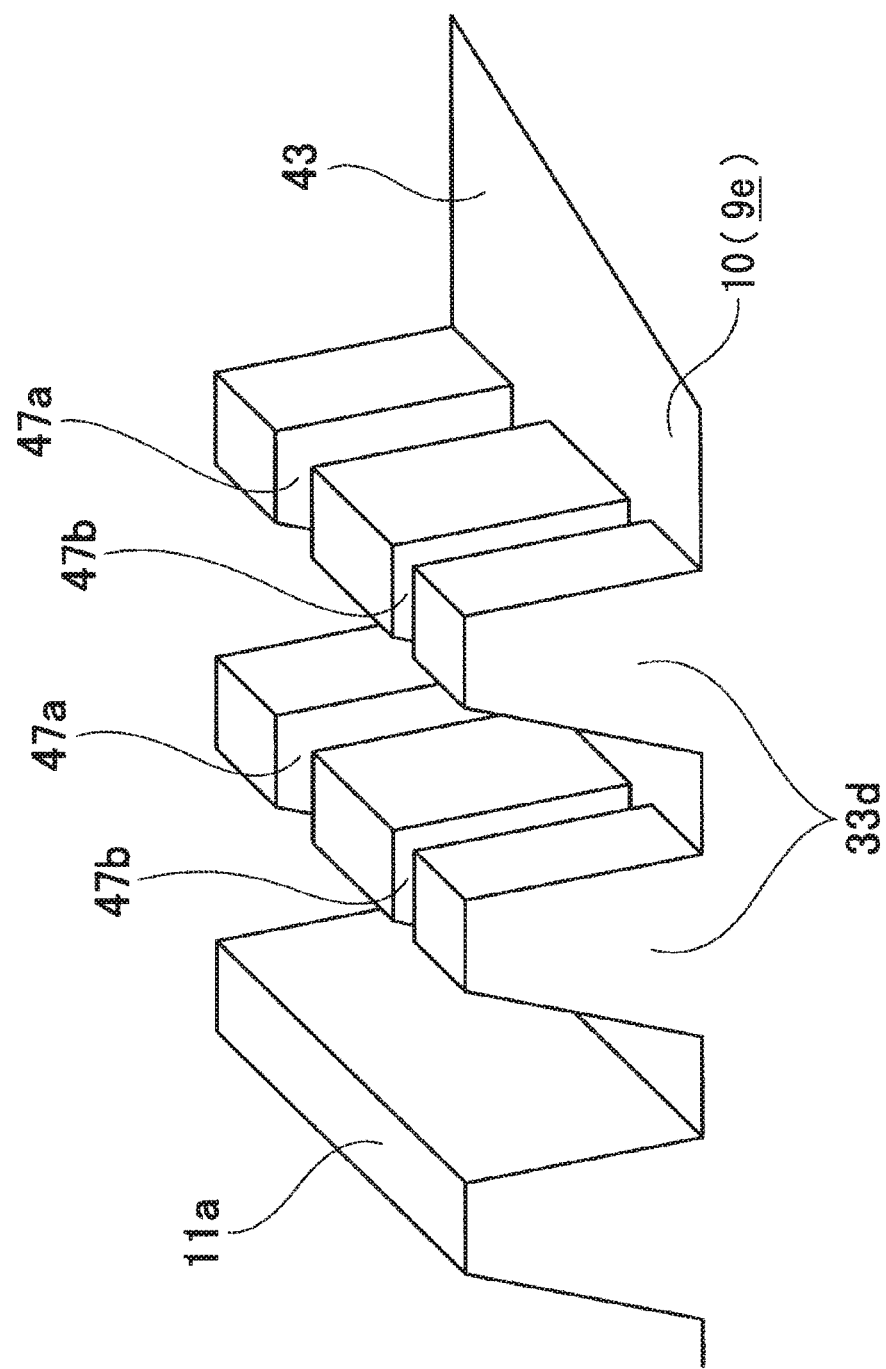
FIG. 7 is an enlarged perspective view of slits formed in dummy teeth, showing a major part thereof.

Alternatively and/or additionally, at least one slit or at least one concave section may be formed in the dummy teeth. In the example (the rack 9e) shown in FIGS. 6 and 7, slits 47a and 47b are formed in a state of passing through the dummy teeth 33d and 33d in the thickness direction (a widthwise direction) at two places in intermediate sections in the forming direction of a plurality of dummy teeth 33d and 33d (two places in the tooth width). Also in the example, the dummy tooth 33d is non-uniformly formed in the second direction parallel to the tooth trace of the rack tooth 11a within a range of the tooth width of the rack tooth 11a (throughout the tooth width of the rack tooth 11a). Accordingly, movement of the material during manufacture of the rack 9e is restricted and/or controlled. The dummy tooth 33d has a non-uniform longitudinal cross section in the second direction parallel to the tooth trace of the rack tooth 11a (the longitudinal cross section perpendicular to the second direction) within a range of the tooth width of the rack tooth 11a (throughout the tooth width of the rack tooth 11a) on the basis of the shape or the like. For example, the dummy tooth 33d may be formed such that a position and/or a shape of the longitudinal cross section perpendicular to the second direction varies in the second direction (the longitudinal cross section is laterally shifted according to the position in the second direction, a shape of the longitudinal cross section of the dummy tooth 33d varies according to the position in the second direction, and so on). A width dimension (a gap) of the slits 47a and 47a formed on the portion (an upper side in FIG. 6) closer to one ends of the dummy teeth 33d and 33d in the forming direction is smaller than a width dimension of the slits 47b and 47b also formed on the portion (a lower side in FIG. 6) closer to the other end. Accordingly, an area of a planar portion on one side in the axial direction (a left side in FIG. 6) among the portion on one side surface of the rack 9e in the radial direction on which the rack teeth 11a and 11a are formed (portions shown by inclined lattices in FIG. 6, i.e., portions between the rack teeth 11a and 11a and the dummy teeth 33d and 33d, a portion between the dummy teeth 33d and 33d, the flat surface portion 43 present between the dummy teeth 33d and 33d and the inclined surface section 45, and bottom surfaces of the slits 47a and 47b) is substantially equal on both side portions of the virtual plane a that includes the central axis O of the rack 9e and that is perpendicular to the planar portion. Accordingly, when the rack teeth 11a and 11a and the dummy teeth 33d and 33d are formed, a resistance with respect to movement of the metal material that constitutes the rack 9e toward the other portion (the circular pole section 44 side) can be substantially equal on both side portions of the virtual plane a. A configuration and actions of other portions may be the same as in the first example of the above-mentioned embodiment. Instead of and/or in addition to the slits, concave sections may be formed in the dummy teeth 33d. The number or a shape of the slits and/or the concave sections may be variously varied.

It is possible to appropriately combine the above-mentioned embodiments as long as no contradiction occurs. In this case, while the area of a planar portion present at the portion adjacent to the portion on which the rack teeth are formed in the axial direction may be substantially equal on both sides portions of a virtual plane including the central axis and perpendicular to the planar portion, alternatively, a shape of the dummy teeth can be devised such that planar portions are not continuous lengthwise in the axial direction of the rack.

REFERENCE SIGNS LIST

1 Steering wheel
2 Steering shaft
3 Universal joint
4 Intermediate shaft
5 Steering gear unit
6 Input shaft
7 Tie rod
8 Steering column
9, 9a to 9e Rack
10 Rack shaft (main body)
11, 11a Rack teeth
12 Back surface portion
13 Circular pole section
14 Material
15 Receiving mold
16 Concave groove section
17 Pressing punch
18 Intermediate material
19 Partial cylindrical surface section
20 Flat surface portion
21 Die
22 Holding hole
23 Bottom section
24 Inner side surface
25 Guide inclination surface section
26 Tooth forming punch
27 Bare rack
28 Escape flat surface portion
29 Die for sizing
30 Concavo-convex surface section for sizing
31 Mold
32 Pressed concave groove
33, 33a to 33d Dummy tooth
34 Flat surface portion
35 Material
36 Small diameter-side cylindrical section
37 Large diameter-side cylindrical section
38 Cast
39 Rack teeth forming concave section
40 Dummy tooth forming concave section
41 Convex section
42, 42a Metal core
43, 43a Flat surface portion
44 Circular pole section
45 Inclined surface section
46 Curved surface section
47a, 47b Slit

The invention claimed is:

1. A steering rack comprising:
a rack shaft;
a plurality of rack teeth that is formed on the rack shaft and that has a tooth trace inclined with respect to a first direction perpendicular to an axial direction of the rack shaft; and
a dummy tooth aligned with the rack teeth on the rack shaft,
wherein the dummy tooth is non-uniformly formed in a second direction parallel to the tooth trace of the rack teeth.

2. The steering rack according to claim 1,
wherein a substantial inclination angle of the tooth trace of the dummy tooth with respect to the first direction is different from an inclination angle of the tooth trace of the rack teeth with respect to the first direction.

3. The steering rack according to claim 1,
wherein the dummy tooth has a first side surface relatively close to the rack teeth and a second side surface relatively far from the rack teeth, and
an inclination angle of the first side surface with respect to the first direction is substantially different from an inclination angle of the second side surface with respect to the first direction.

4. The steering rack according to claim 1,
wherein a transition portion between a wall of the dummy tooth and another wall aligned with the wall of the dummy tooth has a curved surface.

5. The steering rack according to claim 1,
wherein at least one slit or at least one concave section is formed in the dummy tooth.

6. A method of manufacturing the steering rack according to claim 1, the method comprising:
after forming a surface to be processed having a flat surface shape on a portion of a material in the axial direction, forming the rack teeth and the dummy tooth by plastically deforming the surface to be processed by pressing a punch or a mold having a rack-shaped processing surface against the surface to be processed.

7. A method of manufacturing a steering device including a steering shaft, and a steering gear unit that includes a pinion that is rotatably driven in accordance with a rotation of the steering shaft and a rack which meshes with the pinion, the method comprising:
manufacturing the rack by using the method of manufacturing a rack according to claim 6.

8. A method of manufacturing a vehicle including a steering device, the method comprising:
manufacturing the steering device by using the method of manufacturing a steering device according to claim 7.

9. A steering device comprising:
a steering shaft; and
a steering gear unit that includes a pinion that is rotatably driven in accordance with a rotation of the steering shaft, and the rack according to claim 1 which meshes with the pinion.

10. A vehicle comprising the steering device according to claim 9.

11. A steering rack comprising:
a rack shaft;
a plurality of rack teeth formed on the rack shaft while being inclined with respect to a direction perpendicular to an axial direction; and
at least one dummy tooth formed on the rack shaft while being aligned with the plurality of rack teeth,
wherein an angle formed between a virtual plane perpendicular to the axial direction and a forming direction of the dummy tooth is smaller than an angle formed between the virtual plane and the forming direction of the rack teeth.

12. A steering rack comprising:
a rack shaft;
a plurality of rack teeth formed on the rack shaft while being inclined with respect to a direction perpendicular to an axial direction; and
at least one dummy tooth formed on the rack shaft while being aligned with the plurality of rack teeth,
wherein an angle formed between a virtual plane perpendicular to the axial direction and a far-side edge far from each of the rack teeth among both side edges of the dummy tooth in a widthwise direction is smaller than an angle formed between the virtual plane and a near-side edge close to each of the rack teeth.

13. A steering rack comprising:
a rack shaft;
a plurality of rack teeth formed on the rack shaft while being inclined with a direction perpendicular to an axial direction; and
at least one dummy tooth formed on the rack shaft while being aligned with the plurality of rack teeth,
wherein a portion adjacent to the dummy tooth in the axial direction has a curved surface having a partially arc-shaped cross section.

14. A steering rack comprising:
a rack shaft;
a plurality of rack teeth formed on the rack shaft while being inclined with respect to a direction perpendicular to an axial direction; and
at least one dummy tooth formed on the rack shaft while being aligned with the plurality of rack teeth,
wherein a slit is formed in at least one place in an intermediate section of the dummy tooth in a forming direction of the dummy tooth while passing through the dummy tooth in at least an axial direction.

* * * * *